United States Patent [19]

Collins

[11] Patent Number: 5,052,871
[45] Date of Patent: Oct. 1, 1991

[54] CONNECTED SCREW THREADS

[75] Inventor: John Collins, St. Albans, United Kingdom

[73] Assignee: Mabey Hire Company Limited, Reading, United Kingdom

[21] Appl. No.: 538,302

[22] Filed: Jun. 14, 1990

[30] Foreign Application Priority Data

Jun. 20, 1989 [GB] United Kingdom ............... 8914083

[51] Int. Cl.$^5$ ........................................... F16B 35/00
[52] U.S. Cl. .................................. 411/366; 411/423; 411/436
[58] Field of Search ........ 411/427, 428, 436, 366–370, 411/411, 423; 10/86 R, 81; 29/527.6; 74/424.8 R, 424.8 A, 459

[56] References Cited

U.S. PATENT DOCUMENTS

| | | | |
|---|---|---|---|
| 3,150,535 | 9/1964 | De Valliere | 74/424.8 A |
| 3,216,272 | 11/1965 | Suchocki | 74/424.8 R |
| 3,603,174 | 9/1971 | Patchen et al. | 411/423 |
| 4,512,698 | 4/1985 | Muad | 411/436 |

Primary Examiner—Neill R. Wilson
Attorney, Agent, or Firm—Harry C. Jones, III

[57] ABSTRACT

A modified "Acme" type of male and female thread combination has a single-start male thread (10) of machined steel and a single-start female thread (12) of cast nodular graphite iron. The crown (20) of the female thread (12) is machined but the flanks (22, 22) and root (24) are left un-machined. There is plenty of clearance left between the crown (14) of the male thread (10) and the root (24) of the female thread (12). This reduces cost and yet the screw threads are adequate for use in a trench-box strut. The feed per revolution is 20 mm.

10 Claims, 1 Drawing Sheet

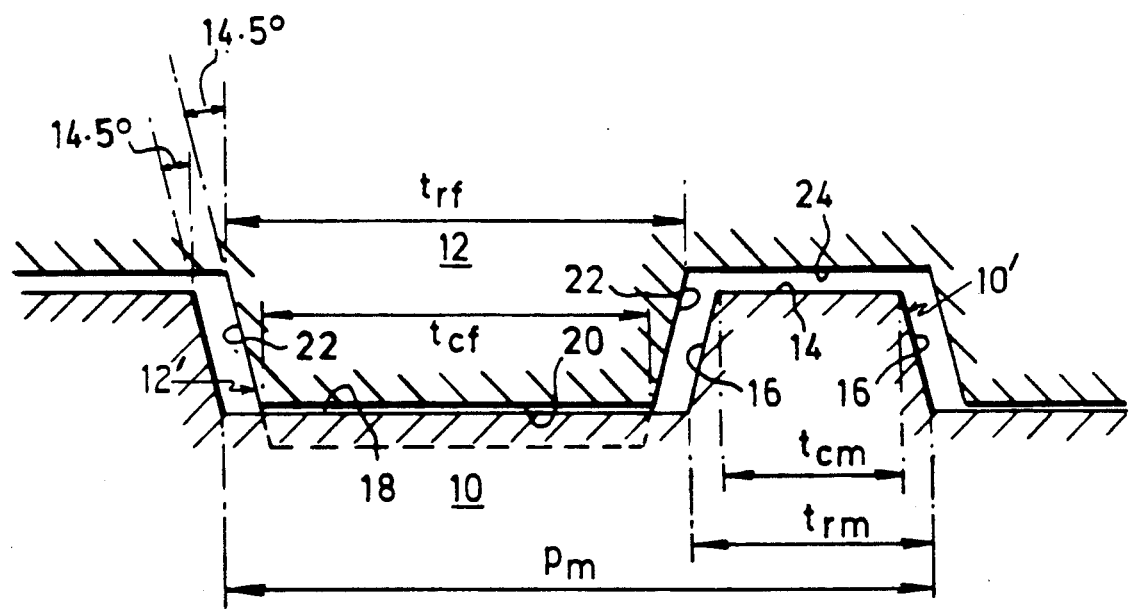

CONNECTED SCREW THREADS

FIELD OF THE INVENTION

This invention relates to screw threads. A particular application of the invention is to screw threads for struts used with trench-box panels to shore up the walls of excavations.

BACKGROUND OF THE INVENTION

Discussion of Prior Art

The criteria for a trench-box strut are as follows: Firstly, the strut is required to apply force to a trench-box panel so as to press the panel against a wall of an excavation in order to shore up the wall. The strut is also required to pull the panel away from the wall when it is desired to remove the trench-box from the excavation. The strut is not required to position the panel with any particular accuracy, nor does the adjustment of the strut require fine control of the strut. However, considerable robustness and strength is required of the strut. If the strut is a screw-type strut, which is usual, if not universal, the screw mechanism is required to be manually operable in both directions, that is, both when extending the strut to press the panel against the wall and when retracting the strut to release the trench-box, and is required to maintain its extension under external applied force when in use. Hence, the screw must be easy enough to turn manually in either direction. It is preferred for only a few turns to be required to retract the strut or extend the strut as desired.

It is common practice to machine screw threads to achieve dimensional tolerances which are acceptable for the particular uses required of the screw threads. However, any machining of a screw thread is a relatively costly operation.

One particular size of standard "Acme" thread has a pitch of 12 mm, giving a feed of 12 mm or 24 mm for a single-start or double-start thread accordingly. This is not an ideal pitch for every application.

SUMMARY OF THE INVENTION

The invention provides a combination of screw threads as claimed in each of the claims, to which reference is directed.

BRIEF DESCRIPTION OF THE DRAWING

The invention will be described by way of example with reference to the drawing, which is a longitudinal axial section through interengaged screw threads of a trench-box strut embodying the invention.

DETAILED DESCRIPTION OF PREFERRED EMBODIMENT

The illustrated screw-threads 10, 12 are designed and made in accordance with the above-mentioned criteria for a trench-box strut.

Referring to the drawing, there is shown a (single-start) male screw-thread member 10 with a raised thread 10' of steel, screwed into a female single-start screw-thread member 12 having a raised thread 12'. The female member is of cast nodular graphite iron. The yield stress of the steel is 345 N/mm$^2$, whilst the 0.2% proof stress of the nodular graphite iron is 230 N/mm$^2$.

The steel male screw-thread member 10 has machined-flat crown 14 and flanks 16, 16 on the thread 10' and a machined-flat root 18, somewhat like the well-known "Acme" thread, whilst the cast-iron female thread member 12 has a thread 12' with a machined-flat crown 20 and un-machined, as cast, flanks 22, 22 and an all-machined, as cast, root 24.

The diametrical measurements of the two screw-threads 10, 12 are as follows:

the minor diameter of the steel male screw thread member 10, that is, the root diameter at the most 18, having been machined or "turned", is 75.82 to 75.97 mm, whilst its major diameter or crown diameter of the thread 10', also after machining, is 83.82 to 83.97 mm;

the minor diameter - that is, the crown diameter of the thread 12' of the female thread member 12 is 74.5 to 75.5 mm as cast; after machining, this diameter becomes 76.00 to 77.00 mm;

the major, or root, diameter at the root 24 of the female thread member 12 as cast is 85.5 to 86 5 mm; this is left un-machined.

The flanks 16, 22 of the threads 10' and 12' are angled at 14.5° in axial longitudinal section (as shown in the drawing).

The raised male screw-thread 10' has a root thickness $t_{rm}$ of 7.07 mm, a crown thickness $t_{cm}$ of 5 mm and a pitch $p_m$ of 20 mm.

The raised female screw-thread 12' has a root thickness $t_{rf}$ of 13 mm, a crown thickness $t_{cf}$ of 10.4 mm and (obviously) a pitch of 20 mm.

The male screw-thread member 10 is 80 mm long The female screw-thread member 12 is longer.

The helix angle is about 5 degrees, more exactly, 4.85 degrees, compared with the standard helix angle for an "Acme" thread of 2.996 degrees.

Although the nodular graphite iron is only about half as strong as the steel, the geometry of the screw-thread member 10, 12 compensates for this, making the female screw-thread member 12 substantially stronger than the male screw-thread member 10.

Although the flanks 22, 22 of the thread 12 and root 24 of the female thread member 12 are un-machined, they are adequate for the purpose required, that is, for use in a trench-box strut having the above-mentioned criteria.

Being single-start and with a pitch of 20 mm, the screw-thread members 10, 12 provide a feed per revolution of 20 mm. This means that only a few turns are required, either to extend or to retract the strut, and yet it will retain a given extension reliably under external load.

The invention may be utilised with advantage for female thread members (not shown) as above but having different major, or root, diameters in the range of 76 mm to 130 mm.

What is claimed and desired to be secured by Letters Patent is:

1. In a machined male screw-thread member screwed into a female screw-thread member of cast iron, the improvement wherein:
   a) the female screw-thread member is machined on the crown of the thread and the thread has a substantially larger crown thickness than the root thickness thereof;
   b) the crown diameter of the female screw thread is in close radial clearance with the root diameter of the male screw thread;
   c) the flanks of the thread and the root of the female screw-thread member are left un-machined; and
   d) there is a substantial radial clearance between the crown of the thread of the male screw-threaded member and the root diameter of the female screw-thread member and between the flanks of the thread of the female screw-thread member and the opposed flanks of the thread of the male screw-thread member along their entire surfaces to provide substantial axial looseness between the threads of the male and female screw-thread members.

2. The combination is claimed in claim 1, wherein the female screw-thread is of cast nodular graphite iron.

3. The combination is claimed in claim 1, wherein the crown, flanks and root of each thread are flat in longitudinal axial section..

4. The combination as claimed in claim 1, wherein the ratio of the female screw-thread root thickness to the male screw-thread root thickness is about 13:7.

5. The combination as claimed in claim 1, wherein the female screw-thread has a major diameter in the range of 76 mm to 130 mm.

6. The combination as claimed in claim 1, wherein the screw-threads are single-start and provide 20 mm feed per revolution.

7. The combination as claimed in claim 1, wherein the helix angle is about 5 degrees.

8. The combination as claimed in claim 1, wherein the female screw-thread is of cast nodular graphite iron;
   wherein the crown, flanks and root of each thread are flat in longitudinal axial section;
   wherein the ratio of the female screw-thread root thickness to the male screw-thread root thickness is about 13:7;
   wherein the female screw-thread has a major diameter in the range of 76 mm to 130 mm;
   wherein the screw-threads are single-start and provide 20 mm feed per revolution; and
   wherein the helix angle is about 5 degrees.

9. A male screw-thread screwed into a female screw-thread, said female screw-thread being made of cast iron, the male screw-thread having machined-flat flanks, root and crown, the female screw-thread being machined flat on the crown of the thread, the flanks and root of the female screw-thread being substantially flat and left unmachined, a substantial radial clearance between the machined-flat crown diameter of the male screw-thread and the unmachined, substantially flat root diameter of the female screw-thread, the crown thickness of the thread of the female screw-thread member being greater than the root thickness of the thread of the male screw-thread member, and, the root thickness of the thread of the female screw-thread member being substantially greater than the root thickness of the thread of the male screw-thread member.

10. The combination as claimed in claim 9 wherein:
   a) the flanks of the threads of said male and female screw-thread members are each angled, the root thickness of the thread of the male screw-thread member being greater than the crown thickness thereof; and
   b) the root thickness of the thread of the female screw thread member is greater than the crown thickness thereof.

* * * * *